A. TORTORICE.
COFFEE COOKING DEVICE.
APPLICATION FILED FEB. 27, 1920. RENEWED FEB. 8, 1921.
1,382,574.
Patented June 21, 1921.
2 SHEETS—SHEET 1.
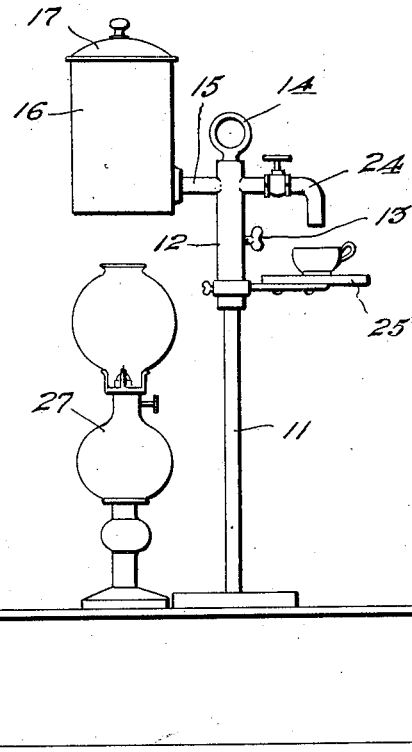
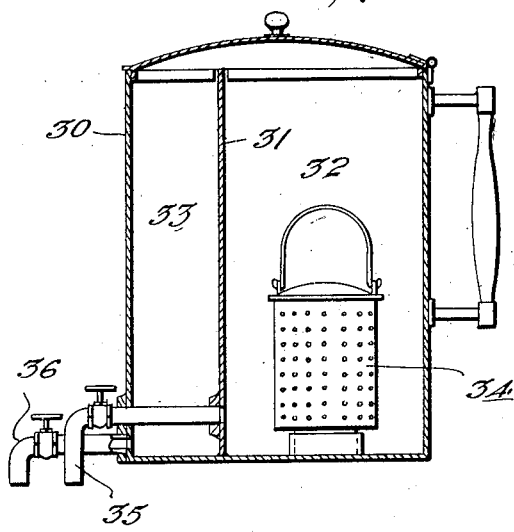
Inventor
A. Tortorice
By Victor J. Evans
Attorney

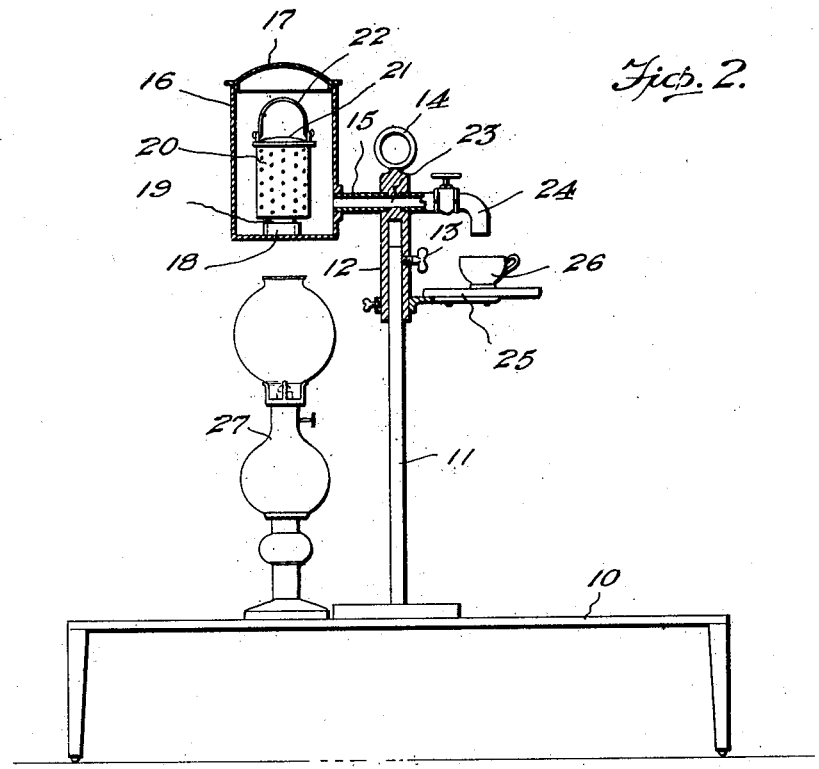

UNITED STATES PATENT OFFICE.

ANTONINO TORTORICE, OF LUTCHER, LOUISIANA.

COFFEE-COOKING DEVICE.

1,382,574.   Specification of Letters Patent.   Patented June 21, 1921.

Application filed February 27, 1920, Serial No. 361,761. Renewed February 8, 1921. Serial No. 443,495.

*To all whom it may concern:*

Be it known that I, ANTONINO TORTORICE, a citizen of the United States, residing at Lutcher, in the county of St. James, and State of Louisiana, have invented new and useful Improvements in Coffee-Cooking Devices, of which the following is a specification.

This invention relates to cooking devices, particularly to devices for the preparation of coffee, and has for its object the provision of a coffee percolating device particularly adapted to be mounted upon a counter or other place in a lunch room, or other place where its use is desired and so constructed as to cook coffee in a thorough, efficient, and rapid manner while at the same time the device presents a very neat appearance and will be attractive in every way.

An important object is the provision of a coffee preparing device of this character which will use either an alcohol or other fuel stove as heating means or a suitable electric heating device, the device being furthermore so constructed as to be easily taken apart for purposes of cleaning or repairing.

An additional object is the provision of a device of this character which will be simple and inexpensive in manufacture, efficient and rapid in use, durable in service, and a general improvement in the art.

With the above and other objects and advantages in view the invention consists in the details of construction to be hereinafter more fully described and claimed, and illustrated in the accompanying drawings in which—

Figure 1 is a side elevation of the device.

Fig. 2 is a longitudinal sectional view.

Fig. 3 is a longitudinal sectional view through a modified form showing the device formed with separate compartments.

Referring more particularly to the drawings, the numeral 10 designates a suitable supporting stand from which rises a standard 11 upon the upper end of which is mounted a bracket including a sleeve 12 slidable upon the standard and held in adjusted positions by means of a set-screw 13. The bracket member is provided with a handle 14 by means of which the entire device may be easily transported from place to place.

Extending from the rear side of the bracket is an arm 15 which carries a cylindrical casing 16 into which the water is poured and this casing 16 has a suitable cover 17. Disposed within the bottom of the casing is a cup-like member 18 within which is disposed the lower reduced end 19 of a perforated container 20 within which is placed the coffee to be cooked. This container 20 is provided with a cover 21 and a bail 22. The arm 15 is hollow and communicates with the interior of the casing 16 and also communicates with a passage 23 leading through the upper end of the bracket and into a faucet 24 carried by the bracket at the forward side thereof.

Carried by the lower portion of the bracket is a tray 25 upon which is disposed a cup 26 adapted to catch any drippings from the faucet.

Any suitable means may be employed for applying heat to the casing 16, as shown in the drawings. This means is a spirit lamp 27 though it will be readily understood that any other means such as an electric heating coil or the like may be employed for the same purpose.

In the use of the device water is poured into the casing 16 to the desired depth and coffee is placed within the perforated receptacle 20, after which the cover 21 is placed on the receptacle, the receptacle placed within the casing and water, with its reduced lower end 19 engaging within the cup 18, after which the cover 17 is placed on the casing.

Owing to the heat from the lamp 27 the water will boil and will cook the coffee, extracting the strength therefrom in the usual manner while at the same time the grounds cannot become mixed with the water as they will be retained within the perforated container 20. The coffee may then be drawn off through the faucet 24 in the usual manner. It will be observed that the set-screw 13 provides means for holding the bracket at the proper height to dispose the casing at the desired distance above the lamp.

Referring more particularly to Fig. 3, it will be seen that I have provided a modified form of container 30 which is divided by a partition 31 into two compartments 32 and 33 within the former of which is located the coffee holding receptacle 34 and the latter of which is designed to contain water or milk to be kept hot or heated. Separate draw-off cocks 35 and 36 are provided leading to the compartments 32 and 33, respectively.

From the foregoing description and a study of the drawings it will be apparent that I have thus provided a simple and efficient device for the cooking of coffee which will be very clean and sanitary in use, pleasing in appearance, and durable and efficient in service.

While I have shown and described the preferred embodiments of my invention, it is of course to be understood that I reserve the right to make such change in the form, construction and arrangement of parts as will not depart from the spirit of the invention or the scope of the subjoined claim.

Having thus described my invention, I claim:

A device of the character described comprising a support, a standard rising therefrom, a vertically adjustable bracket mounted upon said support, a drip receiving tray carried by the bracket, a handle on the bracket, an arm extending from one side of the bracket and carrying a cylindrical casing, said arm being hollow and communicating with the interior of the casing and with a passage extending through the bracket, a faucet carried by the bracket and communicating with said passage, a perforated container within said casing adapted to contain coffee, and means for applying heat to said casing.

In testimony whereof I affix my signature.

ANTONINO TORTORICE.